United States Patent [19]
Fuller et al.

[11] Patent Number: 5,480,180
[45] Date of Patent: Jan. 2, 1996

[54] UTILITY CART

[75] Inventors: John M. Fuller, Winchester; Scott A. Boothby, Stephens City, both of Va.

[73] Assignee: Rubbermaid Commercial Products, Inc., Winchester, Va.

[21] Appl. No.: 278,925

[22] Filed: Jul. 22, 1994

[51] Int. Cl.⁶ ............................ B62D 39/00; B62D 63/08
[52] U.S. Cl. ......................... 280/656; 280/491.1; 296/27; 296/181
[58] Field of Search ..................................... 280/652, 656, 280/47.18, 401, 491.1, DIG. 8, 87.01; 296/27, 165, 181

[56] References Cited

U.S. PATENT DOCUMENTS

| | | | |
|---|---|---|---|
| D. 249,138 | 8/1978 | Butler | D12/105 |
| D. 286,992 | 12/1986 | Doering | D12/105 |
| D. 325,549 | 4/1992 | Jarvis | D12/105 |
| 360,562 | 4/1887 | Cochrane | 296/27 |
| 496,459 | 5/1893 | Waggener et al. | 296/27 |
| 3,612,600 | 10/1971 | Salichs | 280/656 X |
| 3,834,753 | 9/1974 | Heiter et al. | 296/27 X |
| 4,239,258 | 12/1980 | Burris | 280/639 |
| 4,396,208 | 8/1983 | Koch | 280/789 |
| 4,635,956 | 1/1987 | Morrissette | 280/652 |
| 4,740,008 | 4/1988 | Johnson | 280/475 |
| 4,824,137 | 4/1989 | Bolden | 280/652 |
| 5,249,821 | 10/1993 | Ricketts et al. | 280/638 |
| 5,299,826 | 4/1994 | Flowers | 280/656 X |

FOREIGN PATENT DOCUMENTS

| | | | |
|---|---|---|---|
| 0223126 | 6/1985 | Germany | 280/656 |
| WO86/02326 | 4/1986 | WIPO | 280/656 |
| 9418049 | 8/1994 | WIPO | 280/87.01 |

OTHER PUBLICATIONS 2 page advertisement, "Estate Masters"; AECO Estate Products Limited, 1552 Hertel Ave., Suite 905, Buffalo, New York 14216–2882; Jan. 1992.

1 page advertisement, "Converta–Cart"; Converta–Cart, a Division of Enterprising Associates Council Inc., 1668 Kings Down Circle, Atlanta, Georgia 30338; Jan. 1, 1992.
2 page advertisement; Brinly Carts; Jan. 1992.
1 page advertisement, "Versa–Cart™ System"; Jan. 1992.
3 page advertisement, "Lambert Ready–To–Assembly T–10RTA, HT–10RTAA", Lambert Corporation, 117 S. Third, Box 278, Ansonia, Ohio 45303; Jan. 1992.
4 page brochure, "The Heavyweights", Agri–Fab, 303 West Raymond St., Sullivan, Illinois 61951; Jul. 1991.
1 page advertisement, "A Complete Line of Carts"; Allegheny International Hardware Group, True Temper, Jackson Cyclone, Wilkinson Sword, P.O. Box 3500, Shiremanstown, Pa. 17011, 1978.
4 page brochure, "Rubbermaid Tractor Cart"; Rubbermaid Commercial Products Inc., 3124 Valley Ave., Winchester, Va. 22601, 1993.
1 page advertisement, "Trailer/Dump Cart"; Precision Products Inc., 2415 S. Grand E., P.O. Box 2546, Springfield, Ill. 62708.
1 page advertisement, "Kimpex USA Ltd. Lawn & Garden Accessories", pub. date unknown.
1 page advertisement, "Consumer Carts"; Kelley Mfg. Co., 10745 Marina Drive, Olive Branch, Miss. 38654, pub. date unknown.

Primary Examiner—Brian L. Johnson
Attorney, Agent, or Firm—Renner, Kenner, Greive, Bobak, Taylor & Weber

[57] ABSTRACT

A utility cart (10) includes a base support member (11) which is supported on wheels (17). Side walls (12, 13) are removably positioned on the base support member (11) by inserting downwardly extending projections (25) into slots (24) formed in the base support member (11). Front and rear end walls (14, 15) have slots (28) therein to engage flanges (30) formed on the side walls (12, 13) to interlock the end walls (14, 15) to the side walls (12, 13). The bottoms of the end walls (14, 15) are also provided with downwardly extending projections (25) which are received in additional slots (24) formed in the base support member (11).

15 Claims, 2 Drawing Sheets

UTILITY CART

TECHNICAL FIELD

This invention relates to a utility cart specifically of the type intended to be pulled behind a small tractor or lawn vehicle. More particularly, this invention relates to such a cart which is modular in nature, being capable of being quickly disassembled or assembled into a variety of configurations dependent on the desired usage thereof.

BACKGROUND ART

Utility carts which are employed by the homeowner or gardener to transport items, such as rocks, trash, mulch and the like, around his property have become increasingly popular. Most such carts are metallic in nature, are supported by wheels upon which they move, and are provided with some type of hitching mechanism so that they may be pulled behind a tractor, lawn mower or the like. Some such carts even provide for a mechanism permitting the dumping of the cargo from the rear thereof, and recently it has been proposed to make such carts out of a reinforced plastic material.

Because these carts usually include some type of wheel and hitch supporting undercarriage which also carries the body of the cart which includes a bottom and four upstanding sidewalls, they are difficult to ship from the manufacturer to the retailer and difficult for the user to store in view of the space taken by the assembled cart. Moreover, these carts lack versatility in that they are only capable of holding materials which can be confined within the four walls of the cart.

Thus, the need exists for a lightweight, utility cart which can be economically shipped and stored while at the same time be versatilely usable by the homeowner and gardener.

DISCLOSURE OF THE INVENTION

It is therefore an object of the present invention to provide a utility cart which is modular in nature.

It is another object of the present invention to provide a utility cart, as above, which can therefore be configured differently, dependent on the intended usage, thereby being versatile in nature.

It is a further object of the present invention to provide a utility cart, as above, which can be conveniently and economically shipped from place to place and conveniently stored when not in use.

It is an additional object of the present invention to provide a utility cart, as above, which can have its cargo readily dumped or otherwise removed therefrom.

It is yet another object of the present invention to provide a utility cart, as above, which is lightweight, made of a plastic material, and yet otherwise strong enough to handle its expected loads.

These and other objects of the present invention, as well as the advantages thereof over known prior art forms, which shall become apparent from the description to follow, are accomplished by the invention hereinafter described and claimed.

In general, a utility cart made in accordance with the present invention includes a base support member which carries wheels to render the cart mobile. Opposed side walls and opposed end walls are removably attached to the base support member so that selected of the end walls and/or side walls may be positioned to extend upwardly from the base support member.

In accordance with another aspect of the present invention, each end wall is interlocked with its adjacent side wall so as to tie all of the walls together.

A preferred exemplary utility cart incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
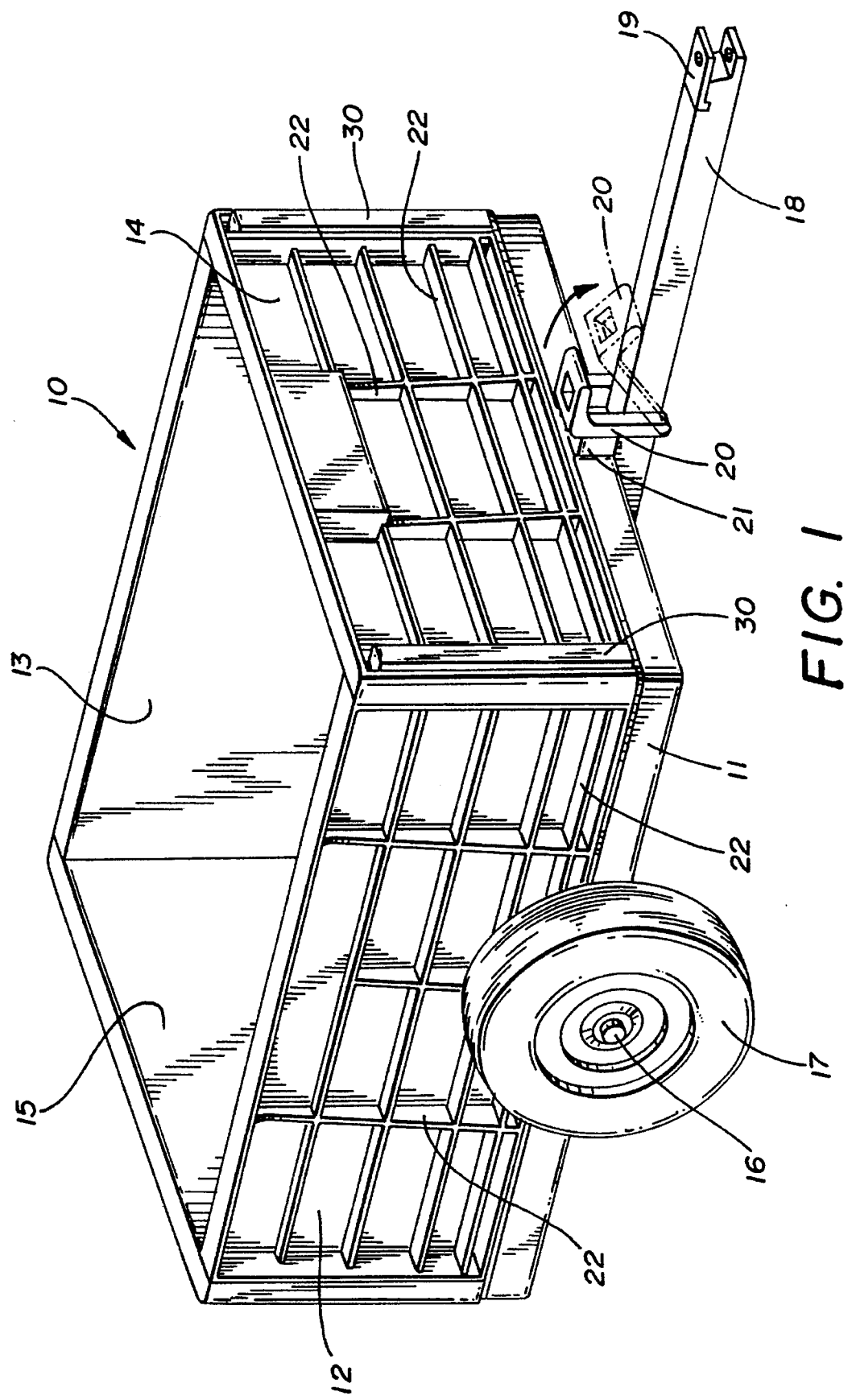
FIG. 1 is a perspective view of a utility cart made in accordance with the concepts of the present invention.

A utility cart made in accordance with the concepts of the present invention is indicated generally by the numeral 10 in FIG. 1. cart 10 includes a base support member 11, opposed side walls 12 and 13 extending upwardly therefrom, and opposed front and rear end walls 14 and 15, respectively, extending upwardly therefrom. Side walls 12 and 13, and end walls 14 and 15 thus serve to confine items placed on support member 11 to be carried in cart 10.

The underside of base support member 11 carries an axle 16 in a conventional fashion which, in turn, carries wheels 17 to render cart 10 mobile when attached to an appropriate power source. To that end, a drawbar 18 is conventionally pivotally carried at one end on the underside of base support member 11 and is adapted, at its other end 19, typically to be attached to a small lawn tractor or the like so that cart 10 can be pulled and moved on wheels 17. Of course, cart 10 may be manually pulled without departing from the concepts of the present invention. A latch 20 is pivotally mounted on drawbar 18 near support member 11 so that it can selectively engage a projection 21 molded onto and extending forwardly of base support member 11. By pivoting latch 20, as shown in chain lines in FIG. 1, projection 21 is released and cart 10 may be pivoted on axle 16 as may be desired, for example, to dump materials being carried by cart 10.

All of the components of cart 10, with the exception of axle 16 and wheels 17, are preferably molded of a structural foam plastic. As such, the components can be made relatively thin, and lightweight, but vertical and horizontal ribbing 22 can be added to walls 12, 13, 14 and 15 to provide extra strength while still maintaining the lightweight feature. It should be noted that it is preferred that the vertical ribbing 22 taper inwardly as it extends upwardly, that is, it is thicker at the bottom near base support member 11, where more forces would be expected. Similarly, the horizontal ribbing 22 is more closely spaced near the bottom of walls 12, 13, 14 and 15 for that same reason. Ribs 23 (FIG. 2) are also provided on the underside of base support member 11, and even drawbar 18 can be made of structural foam with appropriate underside ribbing to enable it to withstand the stresses to which it is subjected.

Figure 2:
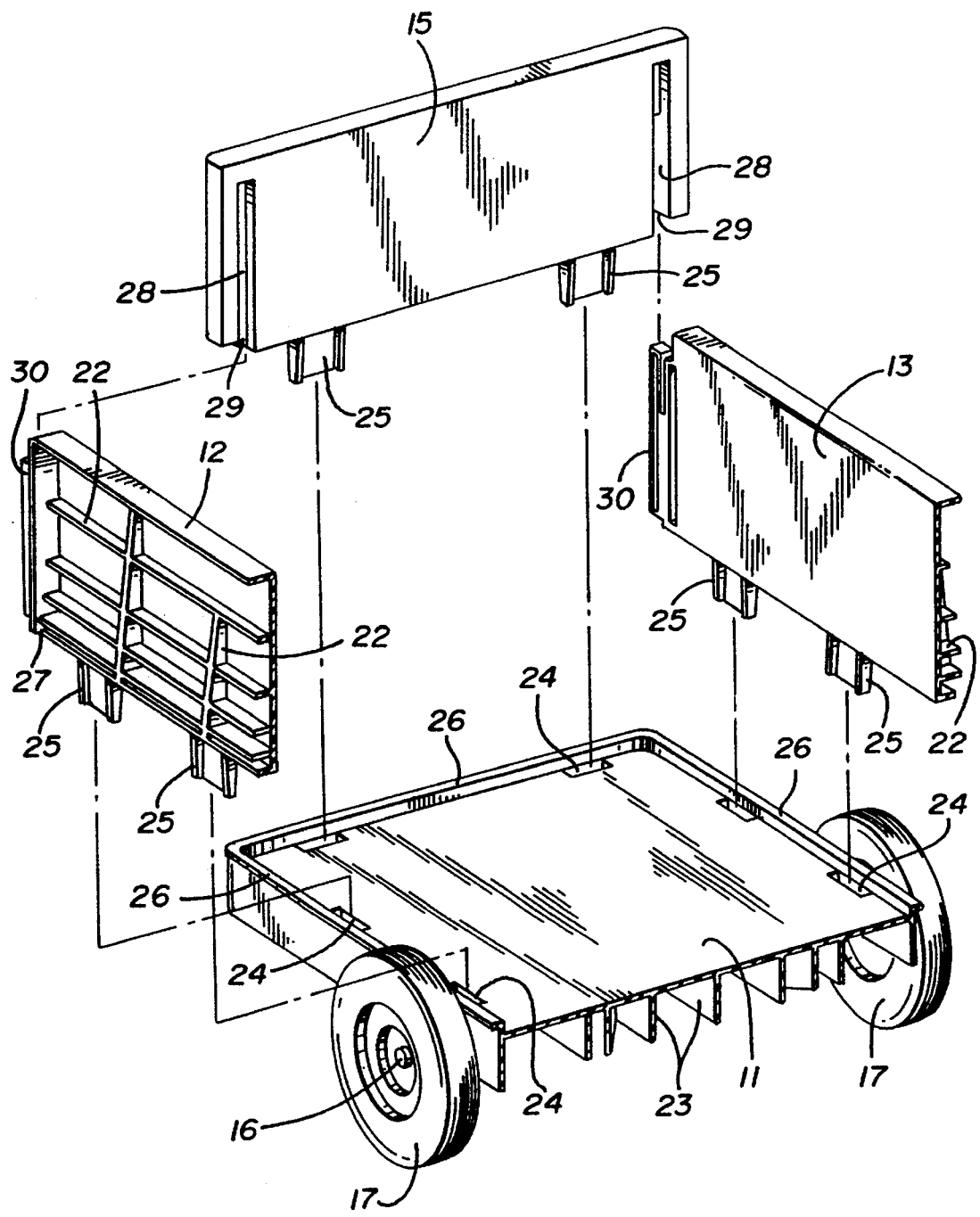
FIG. 2 is an exploded, fragmented, perspective view showing more of the details of some of the components of the utility cart of FIG. 1 and the manner in which they are interconnected.

The manner in which cart 10 is assembled is shown in FIG. 2. As shown, base portion 11 is provided with a plurality of longitudinally extending slots 24 positioned near and generally paralleling the periphery thereof. Slots 24 are adapted to receive I-beam shaped lug projections 25 extending downwardly from all walls 12, 13, 14 and 15. It is preferred, but not absolutely necessary, that at least three slot 24 and lug projection 25 combinations should be provided for side walls 12 and 13, while only two such combinations are necessary for the shorter front and rear end walls 14 and 15. When cart 10 is loaded with material, outward forces on walls 12, 13, 14 and 15 may be created. So that all of these forces are not directed solely to projections 25, base portion 11 is provided with an upwardly directed peripheral lip 26 which engages a bearing notch 27 formed at the bottom of all walls 12, 13, 14, 15. Thus when walls 12, 13, 14 and 15 are seated on base portion 11, any outward force thereon is spread uniformly on lip 26.

A vertically directed slot 28 is formed near each side edge of at least one of the opposed sets of walls 12, 13, 14, 15, for example, end walls 14 and 15, as shown. Each slot 28 is open at the bottom, as at 29, so that end walls 14 and 15 may engage side walls 12 and 13 by sliding slots 28 over corresponding flanges 30 formed at the side edges of each side wall 12, 13. Side walls 12, 13 are thereby interlocked with end walls 14, 15.

In assembling cart 10, the walls having flanges 30 therein, in this instance side walls 12 and 13, are first positioned on base support member 11 by fitting projections 25 through slots 24. Then, each end wall 14, 15 may be positioned on support member 11 by generally dropping end walls 14 and 15 downwardly thereby sliding slots 28 along flanges 30 until projections 25 of walls 14 and 15 are engaged in their corresponding base member slot 24. Cart 10 is thus formed with all walls 12, 13, 14 and 15 engaging base member 11 and each adjacent wall. Disassembly is, of course, just as simple with the reverse procedure being followed, and when disassembled, efficient storage of all components of cart 10, for example, flat against a wall, can be accomplished. Shipment of the components of cart 10 can likewise be accomplished in a relatively small carton.

The modular nature of cart 10 also makes it versatile in use. For example, if one would wish to dump the contents of cart 10, rear wall 15 can be quickly and easily removed by lifting wall 15 and thereby sliding slots 28 out of engagement with flanges 30 of the adjacent side walls 12 and 13. Then latch 20 can be pivoted to disengage projection 21 of base support member 11 and the cart is released so that it can be pivoted about axle 16.

Moreover, by removing both front and rear end walls 14, 15, elongate items such as tree branches, pieces of lumber and the like can be carried by the base support member 11 of cart 10 with their ends protruding forwardly and rearwardly to a greater extent than the longitudinal extent of side walls 12 and 13. Cart 10 can even be used as a flatbed cart by removing all walls 12, 13, 14, 15.

As such, it should be evident that a utility cart constructed in accordance with the concept of the present invention, as described herein, accomplishes the objects of the present invention and otherwise substantially improves the art.

We claim:

1. A utility cart comprising a base member, wheels carried by said base member, opposed end walls, opposed side walls, generally vertical and elongate slots formed near the ends in either of said end walls or said side walls, said slots being open at the bottom of either of said walls and terminating near the top of either of said walls, flanges formed at the ends of either said walls or said side walls not having said slots, said flanges being received in Said slots, and connection means to removably attach said end walls and said side walls to said base member so that selected of said end walls and side walls may be attached to and extend upwardly from said base member.

2. A utility cart according to claim 1 wherein said connection means includes slots formed in said base member and lug members extending downwardly from said side walls and said end walls, said lug members being received in said slots to secure said side walls and said end walls to said base member.

3. A utility cart according claim 2 further comprising a lip extending upwardly from the periphery of said base member, said walls having a notch near the bottom thereof to engage said lip.

4. A utility cart according to claim 1 further comprising a drawbar carried by said base member, a projection extending from said base member, and latch means pivotally connected to said drawbar to selectively engage said projection.

5. A utility cart according to claim 4 wherein said base member, said side walls, said end walls, and said drawbar are made of plastic.

6. A utility cart according to claim 5 further comprising rib means to strengthen said side walls, said end walls, and said base member.

7. A utility cart comprising a base member, wheels carried by said base member, opposed end walls extending upwardly from said base member, opposed side walls extending upwardly from said base member, and interlocking means attaching each said end wall to each said side wall adjacent thereto, said interlocking means including generally vertical and elongate slots formed near the ends in either of said end walls or said side walls, said slots being open at the bottom of either of said walls and terminating near the top of either of said walls, flanges formed at the ends of either said walls or said side walls not having said slots, said flanges being received in said slots.

8. A utility cart according to claim 7 further comprising a drawbar carried by said base member.

9. A utility cart according to claim 8 further comprising a projection extending from said base member, and latch means pivotally connected to said drawbar to selectively engage said projection.

10. A utility cart according to claim 8 wherein said base member, said side walls, said end walls, and said drawbar are made of plastic.

11. A utility cart according to claim 10 further comprising rib means to strengthen said side walls and said end walls.

12. A utility cart according to claim 11 further comprising rib means to strengthen said base member.

13. A utility cart according to claim 13 wherein said rib means include generally horizontally extending ribs and vertically extending ribs.

14. A utility cart according to claim 13 wherein said horizontally extending ribs are more closely spaced near the bottom of said walls.

15. A utility cart according to claim 14 wherein said vertically extending ribs are tapered so as to be thicker near the bottom of said walls.

* * * * *